Figure 1:
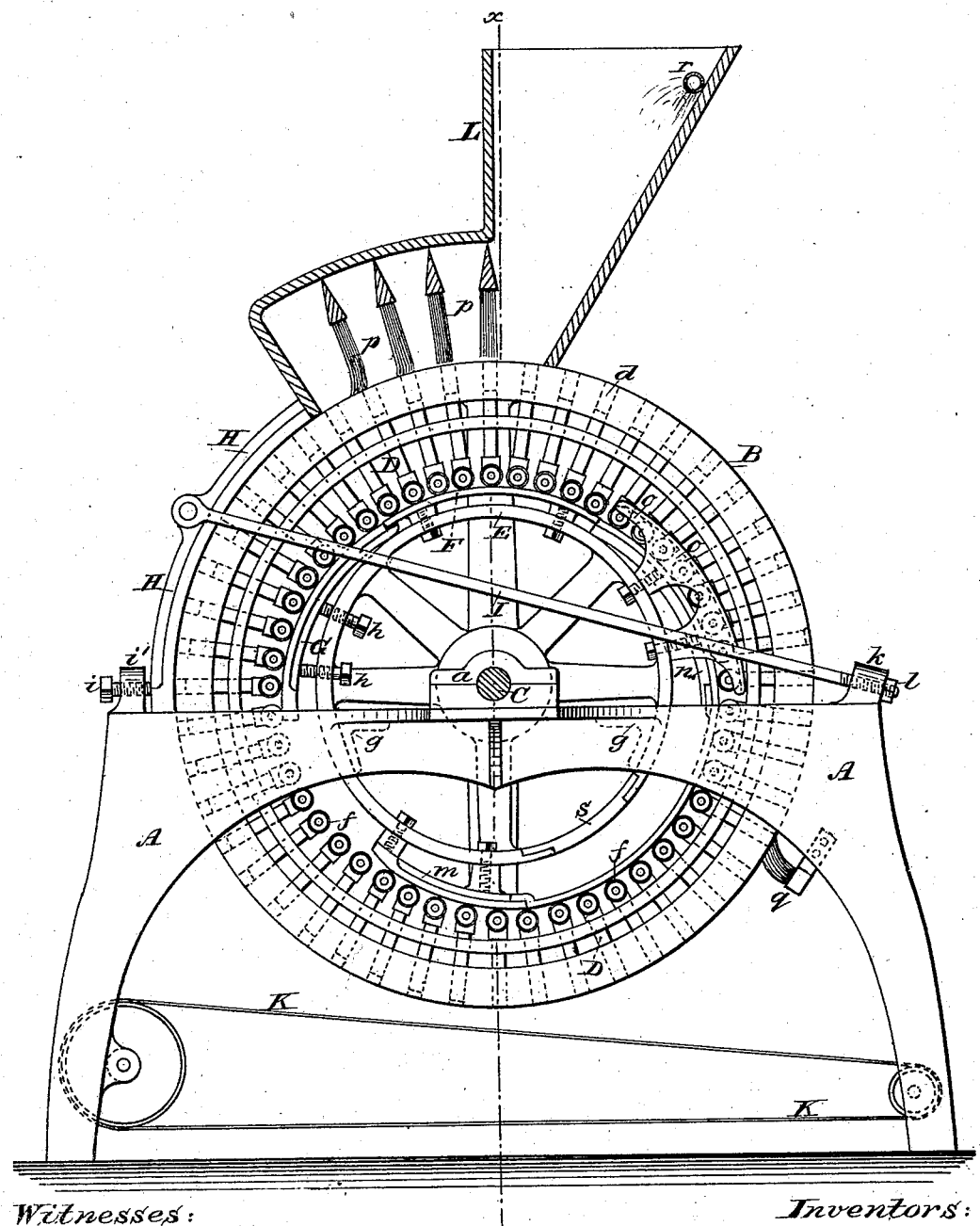

(No Model.)  2 Sheets—Sheet 1.

C. HEMJE & T. C. BRECHT.
MACHINE FOR COMPRESSING PLASTIC AND OTHER MATERIALS.

No. 279,384. Patented June 12, 1883.

Witnesses:
Alex Simon
L. F. Sieleher

Inventors:
Charles Hemje,
Theodore C. Brecht,
By T. C. Brecht,
Attorney.

(No Model.) 2 Sheets—Sheet 2.
C. HEMJE & T. C. BRECHT.
MACHINE FOR COMPRESSING PLASTIC AND OTHER MATERIALS.
No. 279,384. Patented June 12, 1883.
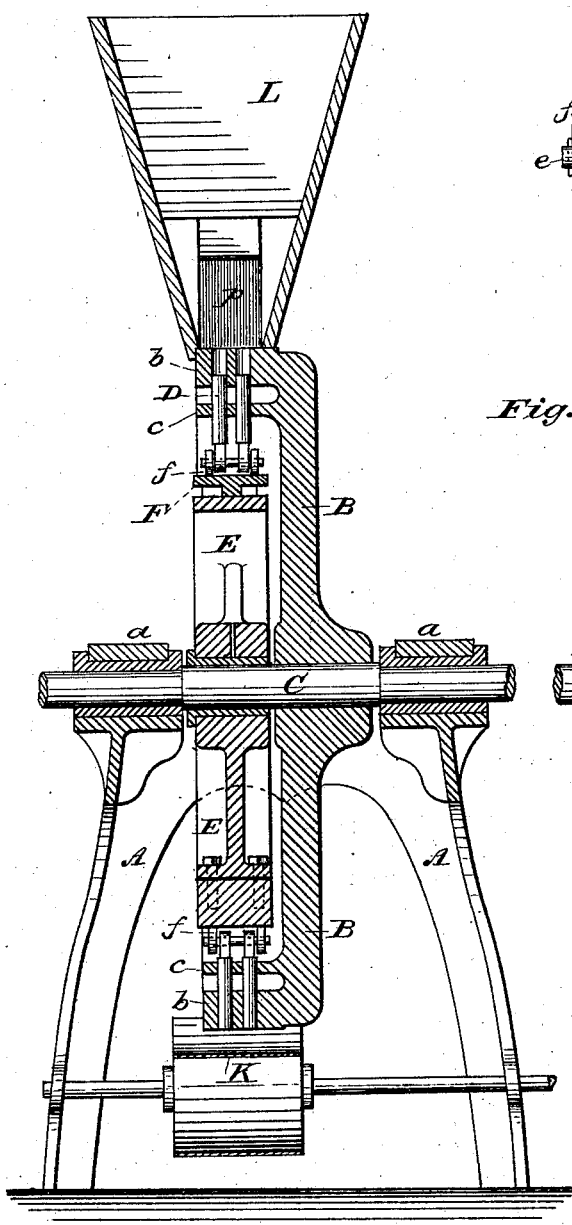
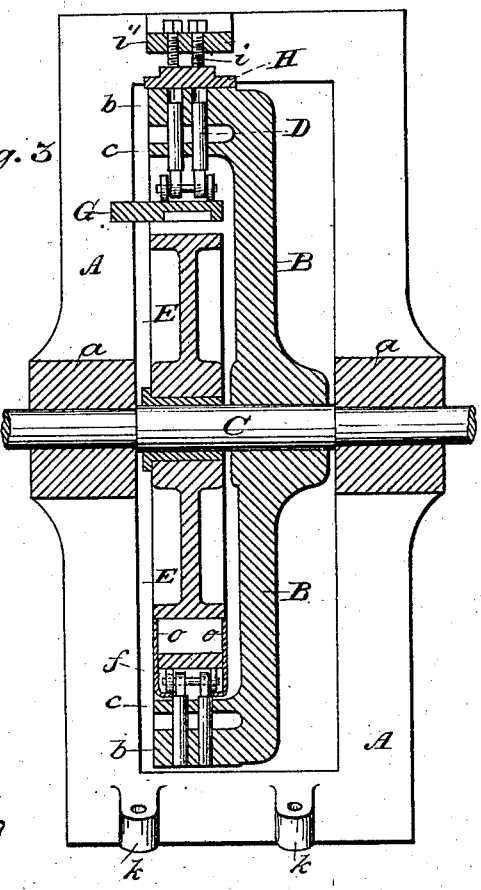
Witnesses:
Inventors:
Charles Hemje,
Theodore C. Brecht,
By T. C. Brecht
Attorney.

UNITED STATES PATENT OFFICE.

CHARLES HEMJE AND THEODORE C. BRECHT, OF WASHINGTON, D. C.

MACHINE FOR COMPRESSING PLASTIC AND OTHER MATERIALS.

SPECIFICATION forming part of Letters Patent No. 279,384, dated June 12, 1883.

Application filed April 3, 1883. (No model.)

*To all whom it may concern:*

Be it known that we, CHARLES HEMJE and THEODORE C. BRECHT, citizens of the United States, residing at Washington, in the District of Columbia, have invented certain new and useful Improvements in Machines for Compressing Plastic and other Materials; and we do hereby declare the following to be a full, clear, and exact description of the invention, such as will enable others skilled in the art to which it appertains to make and use the same.

Our invention relates to improvements in apparatus or machines for compressing plastic, pulverized, granulated, and other materials; and the object of our invention is to produce an apparatus or machine for forming cakes, cubes, cylinders, or other shaped articles from pure materials, so that they become solid and hard enough to be handled without breaking.

Our invention consists in apparatus or machines for compressing pulverized, granulated, or other materials, without the aid of any cement or binding materials, into molds of suitable size and shape, and applying to the compressed cubes or cakes, &c., a slight moisture, by means of a suitable spraying apparatus, so as to form a thin crust or film of the same material after the moisture has been evaporated; or the pulverized or granulated materials may be subjected to a slight moistening beforehand, either by pure water or water diluted with a little sugar, sirup, or other equivalent materials, and afterward compressed, which latter process will make the cakes or cubes solid and perfectly hard after the moisture has evaporated, all of which will be more fully described hereinafter, reference being had to the accompanying drawings, in which—

Figure 1 represents a side elevation of our machine, partly in section. Fig. 2 is a vertical cross-section of the same on line $x\,x$. Fig. 3 is a horizontal section of the same. Figs. 4 and 5 are detail views of the plungers.

In the drawings, A represents a suitable strong frame, on which a vertical flanged wheel, B, is secured to a horizontal shaft, C, which revolves in bearings $a\,a$, attached to the frame A. The flange on said wheel B can either be made thick enough so as to form sufficient guide for the plungers, or, as shown in the drawings, there can be two flanges, $b$ and $c$, of which the latter acts as a guide to the plungers D. Through these flanges are bored or fitted the holes $d$, in which the plungers travel, said holes being arranged radially. One or more rows of plungers may be employed—two rows being shown in the drawings—in which case the two abreast or in line with each other are connected at their lower end by a shaft or axle, $e$, which is provided with a wheel, $f$, on each end. A stationary spider, E, of smaller diameter than the flanged plunger-wheel, is fitted inside of the latter and on the shaft C, and by means of one or more strong angle-irons, $g$, is firmly secured to the frame.

On the upper side of the wheel B is fastened a short circular piece, F, the height of which regulates the desired depth of the plunger-holes and the size of the product when the plungers are in place. Adjoining this circular piece F is an adjustable circular incline, G, resting with its lower end on the top of the frame A, and with its upper end extending under the end of the circular piece F. It is made adjustable by one or more set-screws, $h$, or their equivalents. On the outer side of the flange of the plunger-wheel B, and opposite to the inclined plane G, is arranged the press-plate H, held firmly against the face of the wheel B, at its lower end, by one or more set-screws, $i$, and at or near its upper end are attached two braces, I, to the opposite ends of the frame, where they pass through lugs $k$ and are adjusted by nuts $l$.

To the lower side of the spider or inner wheel, E, is fastened a circular inclined plane, $m$, for the purpose of pushing out the cakes after they have been compressed.

On the opposite side from the press-plate H is arranged a circular inclined plane, $n$, bolted or fastened firmly to the wheel B, and to the sides of said inclined plane $n$ are fastened the retractors $o$, which serve to pull the plungers back into position for filling the plunger-holes $d$.

On the top of the plunger-wheel B, and touching against the end of the press-plate H, is a suitable feed box or hopper, L, arranged either with revolving or perpendicular brushes $p$ to sweep the pulverized material into the plunger-holes. Within the hopper is arranged a perforated pipe, $r$, through which finely-comminuted water is sprayed among the material to slightly dampen it. The material may, however, be dampened before it is placed in the hopper, if desired.

A removable piece, s, in the stationary wheel E is provided for inserting the plungers into their respective holes.

Below the plunger-wheel is placed an endless belt or apron, K, revolving over suitable rollers or pulleys, and serves for the purpose of carrying off the cakes after they are discharged from the machine.

One or more brushes, q, are arranged at a convenient place on the frame for the purpose of cleaning or brushing off any small particles adhering to the face of the wheel or to the ends of the plungers.

The shaft C is provided with suitable pulleys or gearing to connect with the motive power and the endless belt.

The brushes p and q may be made adjustable to allow for wear, &c.

The operation is as follows: The material, either dry or moistened, is thrown into the hopper L, and as the plunger-wheel B revolves the material is swept into the plunger-holes d by means of the brushes p. After the plungers D have passed the circular plate F they pass on to the inclined plane G, and as they travel up on it they compress the material against the outer press-plate, H, until the lower end of said press-plate is passed, when the compression ceases. The wheels of the plungers will then come in contact with the inclined plane m, which will force them outward until their outer end is flush with the outside or face of the plunger-wheel B, and the compressed cake or block drops on the endless belt K and is carried off. The plungers remain in this position until they have passed the brush q, which cleans the face of the plunger-wheel as well as the ends of the plungers, and when they come in line with the lower end of the inclined plane n the extractors o will take hold on the upper side of the wheels f and gradually pull the plungers back to their original position for filling the plunger-holes d with fresh material.

This machine can also be employed for compressing such materials as sal-soda, alkalies, bicarbonate of soda, &c.

Having thus described our invention, what we claim and desire to secure by Letters Patent, is—

1. In a compressing-machine, an inner stationary wheel, to which the necessary inclines are attached, arranged within a revolving wheel containing the plungers, both mounted on the same shaft, substantially as specified.

2. In a compressing-machine, the revolving plunger-wheel B, provided with flanges b and c, the latter serving as guides for the plungers, substantially as set forth.

3. In a compressing-machine, an inner stationary wheel provided with suitable inclines for operating the plungers in a revolving plunger-wheel having flanges b c, and arranged substantially as shown and herein described.

4. The combination of a revolving plunger-wheel and a stationary inner wheel provided with suitable inclines for operating the plungers, with a press-plate fitting the outer circumference of said plunger-wheel, substantially as specified.

5. The revolving plunger-wheel and stationary inner wheel provided with the necessary inclines, and the extractors o, with a press-plate, H, adjusted by brace-rods I and set-screws i, substantially as set forth.

6. In a compressing-machine, the stationary inner wheel, E, provided with the extractors o, circular plate F, inclines G, m, and n, and removable plate s, in combination with a revolving plunger-wheel, B, substantially as and for the purpose set forth.

7. The combination of a revolving plunger-wheel, B, stationary inner wheel, E, provided with suitable inclines, a press-plate, H, a hopper, L, with brushes p, and a spraying device for moistening the material, substantially as specified.

8. The compressing-machine herein described, consisting of a frame, A, revolving plunger-wheel B, shaft C, plungers D, stationary wheel E, provided with inclines for operating said plungers, a press-plate, H, adjusted by rods I and set-screws i, hopper L, and endless belt K, all arranged substantially as set forth.

9. The combination of a revolving plunger-wheel, B, and stationary inner wheel, E, with the adjustable incline G and press-plate H, arranged substantially as specified.

10. The combination of two or more plungers, D, attached to a shaft, e, provided with rollers f, with the revolving plunger-wheel B and suitable inclines, substantially as set forth.

11. The combination of two or more plungers, D, attached to a shaft, e, provided with rollers f, with the revolving plunger-wheel B, stationary wheel E, press-plate H, and suitable inclines, all arranged substantially as shown and described.

12. The process herein described of compressing cakes, cubes, &c., of materials herein named, by subjecting them to a bath of a comminuted or sprayed fluid, and then to compression, substantially as and for the purpose set forth.

In testimony whereof we hereby affix our signatures in presence of two witnesses.

CHARLES HEMJE.
THEODORE C. BRECHT.

Witnesses:
J. M. YZNAGA,
LLOYD F. KELEHER.